US00RE42054E

(19) United States
(12) Reissued Patent
Park et al.

(10) Patent Number: US RE42,054 E
(45) Date of Reissued Patent: Jan. 25, 2011

(54) HEAT DISSIPATOR FOR A NOTEBOOK COMPUTER

(75) Inventors: Jin Tae Park, Seoul (KR); Ik Sang Sohn, Seoul (KR)

(73) Assignee: Zalman Tech Co., Ltd., Seoul (KR)

(21) Appl. No.: 29/346,061

(22) Filed: Oct. 26, 2009

Related U.S. Patent Documents

Reissue of:
(64) Patent No.: Des. 555,162
Issued: Nov. 13, 2007
Appl. No.: 29/267,477
Filed: Oct. 16, 2006

(51) LOC (9) Cl. ..... 14-03
(52) U.S. Cl. ..... D14/447
(58) Field of Classification Search ..... D14/316, D14/356, 375, 376, 432, 434, 439, 447, 448, D14/451, 452, 457, 460, 328, 324, 405; D6/300, D6/310, 311, 312, 419, 449, 512, 513; D19/20, D19/89, 90, 91; 108/10, 28, 32, 6; 248/442.2, 248/454, 457, 460, 371, 447, 393, 398, 127, 248/133, 136, 178.1, 455, 349.1, 346.03, 248/176.1, 346.06, 346.04, 346.07, 346.01, 248/441.1, 917, 918, 919, 920, 921, 922, 248/923, 924; 361/683, 686
See application file for complete search history.

(56) References Cited

U.S. PATENT DOCUMENTS

| | | | | | |
|---|---|---|---|---|---|
| 2,502,771 | A | * | 4/1950 | Weil | 108/28 |
| D358,278 | S | * | 5/1995 | Goodwin | D6/449 |
| D402,642 | S | * | 12/1998 | Faranda et al. | D14/434 |
| 6,082,696 | A | * | 7/2000 | Patterson | 248/454 |
| D451,292 | S | * | 12/2001 | Cheris et al. | D6/349 |
| D455,755 | S | * | 4/2002 | Levine et al. | D14/447 |
| 6,707,668 | B2 | * | 3/2004 | Huang | 361/679.48 |
| D488,816 | S | * | 4/2004 | Tyler et al. | 361/679.48 |
| D494,977 | S | * | 8/2004 | Persson | D14/447 |
| D522,002 | S | * | 5/2006 | Cheng | D14/439 |
| D540,330 | S | * | 4/2007 | Eyman et al. | D14/451 |
| D543,209 | S | * | 5/2007 | Bae | D14/451 |
| D554,647 | S | * | 11/2007 | Chan | D14/447 |
| D557,267 | S | * | 12/2007 | Beilstein et al. | D14/451 |
| D563,960 | S | * | 3/2008 | Beilstein et al. | D14/447 |
| D568,889 | S | * | 5/2008 | Hughes et al. | D14/451 |
| D576,168 | S | * | 9/2008 | Ostroff | D14/447 |
| 7,663,876 | B2 | * | 2/2010 | Lin | 361/679.47 |
| 2006/0192070 | A1 | * | 8/2006 | Chan | 248/371 |
| 2008/0084661 | A1 | * | 4/2008 | Lee | 361/687 |
| 2008/0316692 | A1 | * | 12/2008 | Jacobs et al. | 361/683 |

* cited by examiner

*Primary Examiner*—Philip S Hyder
*Assistant Examiner*—Angela J Lee
(74) *Attorney, Agent, or Firm*—Jason Y. Pahng

(57) CLAIM

The ornamental design for heat dissipator for a notebook computer, as shown and described.

DESCRIPTION

FIG. 1 is a perspective view of a heat dissipator for a notebook computer in accordance with the invention;
FIG. 2 is a front eleveational view of the heat dissipator;
FIG. 3 is a rear elevational view of the heat dissipator;
FIG. 4 is a left side elevational view of the heat dissipator;
FIG. 5 is a right side elevational view of the heat dissipator;
FIG. 6 is a top plan view of the heat dissipator; and,
FIG. 7 is a bottom plan view of the heat dissipator.

1 Claim, 5 Drawing Sheets

Figure 1:
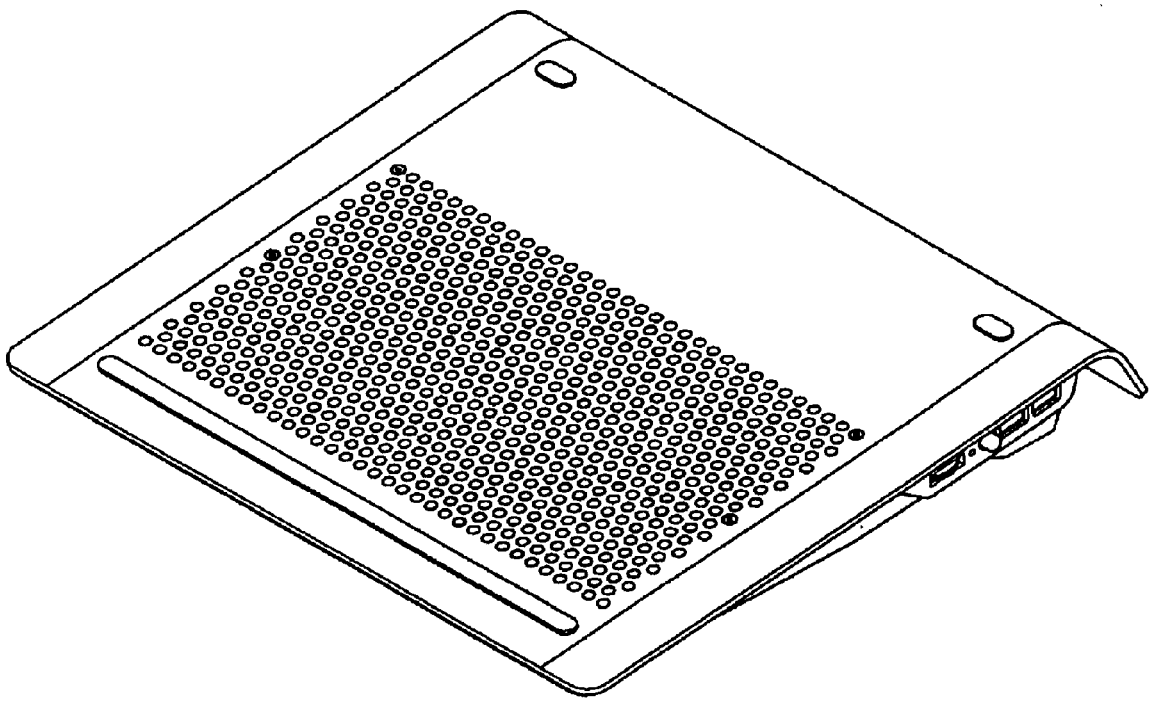
Figure 2:
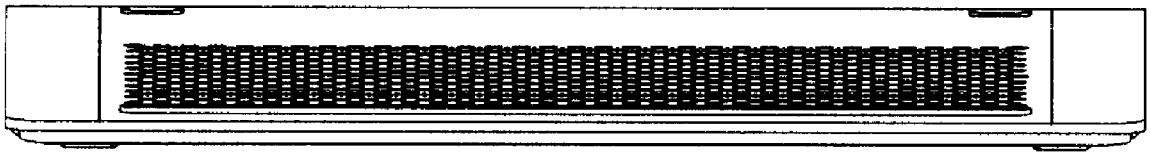
Figure 4:
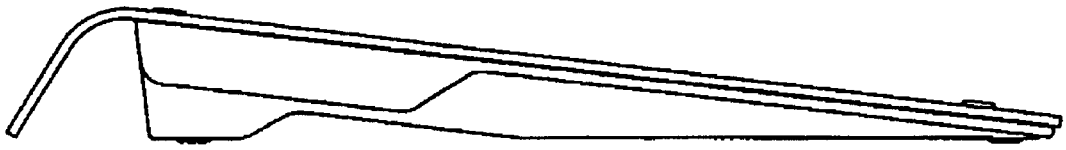
Figure 5:
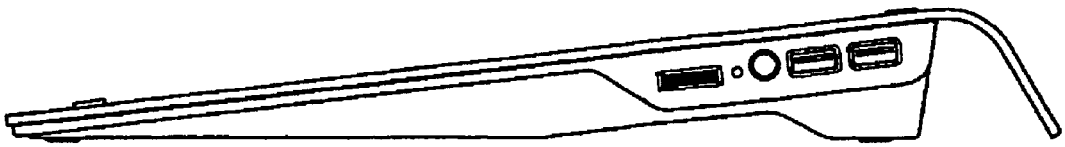
Figure 6:
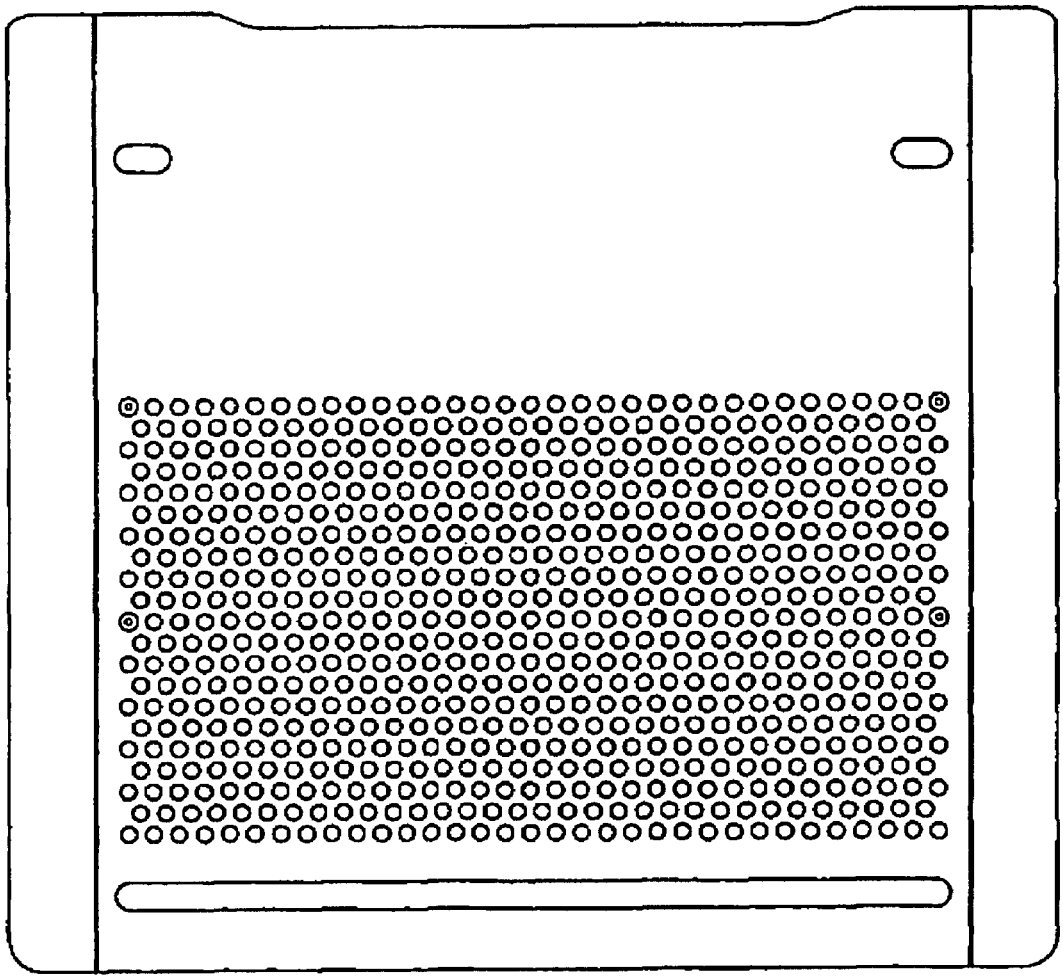
Figure 7:
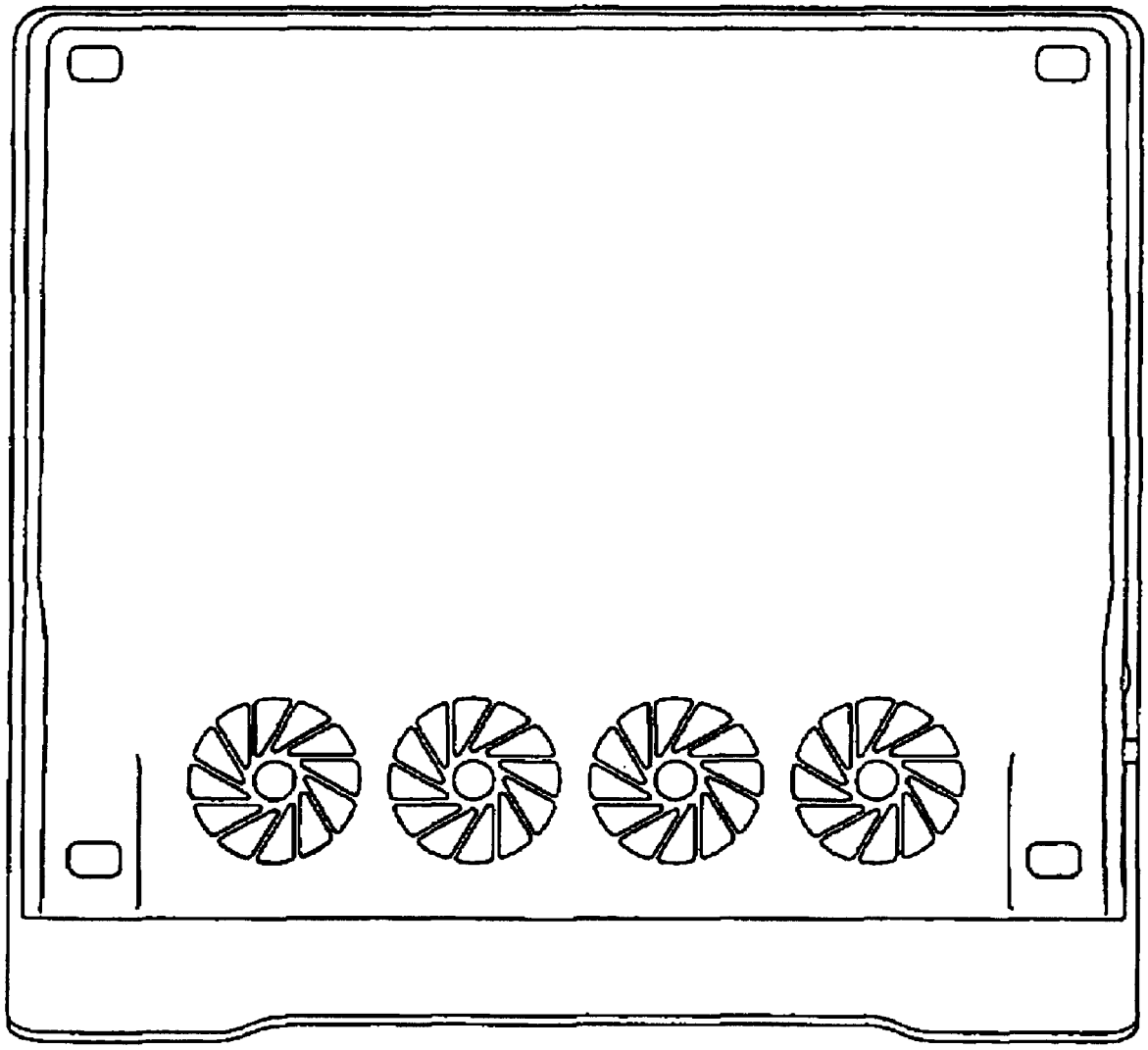

Matter enclosed in heavy brackets [ ] appears in the original patent, but forms no part of this reissue specification; matter printed in italics indicates the additions made by reissue.

FIG. 3 (Amended)
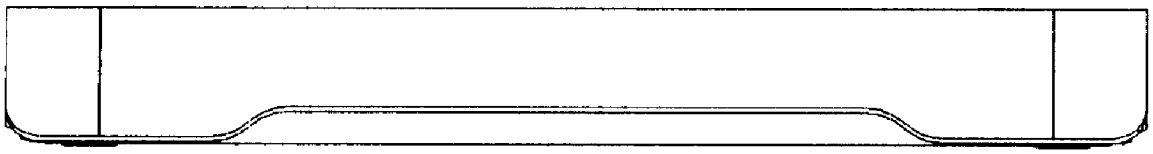

HEAT DISSIPATOR FOR A NOTEBOOK COMPUTER